(12) United States Patent
Krishnan et al.

(10) Patent No.: US 9,094,524 B2
(45) Date of Patent: Jul. 28, 2015

(54) ENHANCING CONFERENCING USER EXPERIENCE VIA COMPONENTS

(75) Inventors: Parameshwaran Krishnan, Basking Ridge, NJ (US); Navjot Singh, Denville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 151 days.

(21) Appl. No.: 13/603,264

(22) Filed: Sep. 4, 2012

(65) Prior Publication Data

US 2014/0064471 A1 Mar. 6, 2014

(51) Int. Cl.
| H04M 3/42 | (2006.01) |
| H04M 11/00 | (2006.01) |
| H04M 1/00 | (2006.01) |
| H04L 12/16 | (2006.01) |
| H04Q 11/00 | (2006.01) |
| H04N 7/14 | (2006.01) |
| H04M 3/56 | (2006.01) |

(52) U.S. Cl.
CPC ...... *H04M 3/567* (2013.01); *H04M 2203/2094* (2013.01); *H04M 2203/50* (2013.01)

(58) Field of Classification Search
CPC ......... H04M 3/42; H04M 3/56; H04M 3/564; H04M 3/565; H04M 3/566; H04M 3/567; H04M 3/568; H04M 3/42221; H04M 7/006; H04N 7/14; H04N 7/141; H04N 7/142; H04N 7/144; H04N 7/146; H04N 7/147; H04N 7/148; H04N 7/15; H04N 7/152; H04N 7/155; H04N 7/157; H04L 12/18
USPC ................ 379/90.01, 93.01, 93.21, 157, 158, 379/201.01, 202.01, 207.01; 348/14.01, 348/14.02, 14.03, 14.04, 14.05, 14.06, 14, 348/7, 14.08, 14.09, 14.1, 14.11, 14.12, 348/14.13, 14.14, 15.15, 14.16; 370/259, 370/260, 261, 262; 455/414.1, 416
See application file for complete search history.

(56) References Cited

U.S. PATENT DOCUMENTS

| 6,826,159 | B1 | 11/2004 | Shaffer et al. |
| 7,099,448 | B1 | 8/2006 | Laniepce et al. |
| 7,272,385 | B2 * | 9/2007 | Mirouze et al. ............ 455/414.1 |
| 7,460,656 | B2 | 12/2008 | Lam et al. |
| 7,653,013 | B1 * | 1/2010 | Moran .......................... 370/261 |
| 7,733,231 | B2 | 6/2010 | Carney et al. |
| 7,783,022 | B1 | 8/2010 | Jay et al. |
| 7,848,738 | B2 | 12/2010 | Diethorn |

(Continued)

OTHER PUBLICATIONS

IBM Corporation, "IBM Tivoli Access Management", White Paper, Dec. 2009, 16pgs.

(Continued)

*Primary Examiner* — Khai N Nguyen
(74) *Attorney, Agent, or Firm* — Maldjian Law Group LLC; John Maldjian; William J. Connelly, III

(57) ABSTRACT

An enhanced user experience during a telecommunications conference may be achieved by using components of devices associated with users as ephemeral adjuncts to a conferencing system. These components may be associated with equipment in a conference room or location such that other participants in the conference may not recognize the use of the device. The quality of a user's experience may thus be improved by using a device and associated components in close proximity to the user. Other participants in a conference may also perceive a benefit from improved intelligibility.

20 Claims, 3 Drawing Sheets

(56) References Cited

U.S. PATENT DOCUMENTS

| | | | |
|---|---|---|---|
| 7,876,890 B2 | 1/2011 | Diethorn | |
| 7,894,890 B2 | 2/2011 | Sun et al. | |
| 7,983,406 B2 | 7/2011 | Diethorn | |
| 8,050,917 B2 | 11/2011 | Caspi et al. | |
| 8,095,120 B1 | 1/2012 | Blair et al. | |
| 8,471,889 B1 * | 6/2013 | Lee et al. | 348/14.07 |
| 2003/0081751 A1 | 5/2003 | Berstis | |
| 2003/0231746 A1 | 12/2003 | Hunter et al. | |
| 2004/0023664 A1 * | 2/2004 | Mirouze et al. | 455/456.1 |
| 2004/0071099 A1 * | 4/2004 | Costa-Requena et al. | 370/260 |
| 2004/0071100 A1 * | 4/2004 | Klaghofer | 370/261 |
| 2004/0121818 A1 * | 6/2004 | Paakkonen | 455/567 |
| 2004/0202303 A1 * | 10/2004 | Costa-Requena et al. | 379/205.01 |
| 2004/0203630 A1 * | 10/2004 | Wang | 455/414.1 |
| 2005/0235148 A1 | 10/2005 | Scheidt et al. | |
| 2005/0243721 A1 * | 11/2005 | Cai et al. | 370/230 |
| 2006/0094438 A1 * | 5/2006 | Hamilton et al. | 455/452.2 |
| 2007/0139199 A1 | 6/2007 | Hanlon | |
| 2007/0260684 A1 | 11/2007 | Sharma et al. | |
| 2008/0037751 A1 * | 2/2008 | Aldrey et al. | 379/202.01 |
| 2008/0101576 A1 | 5/2008 | Vernick | |
| 2008/0104171 A1 * | 5/2008 | Berberian et al. | 709/204 |
| 2008/0205616 A1 | 8/2008 | Teng et al. | |
| 2008/0233934 A1 | 9/2008 | Diethorn | |
| 2008/0238670 A1 | 10/2008 | Carney et al. | |
| 2008/0305786 A1 * | 12/2008 | Arumi et al. | 455/426.1 |
| 2009/0005073 A1 * | 1/2009 | Shaffer et al. | 455/456.2 |
| 2009/0097628 A1 * | 4/2009 | Yap et al. | 379/202.01 |
| 2009/0189739 A1 | 7/2009 | Wang | |
| 2009/0282103 A1 * | 11/2009 | Thakkar et al. | 709/204 |
| 2009/0287783 A1 * | 11/2009 | Beare et al. | 709/206 |
| 2010/0165887 A1 | 7/2010 | Ristock et al. | |
| 2010/0317323 A1 | 12/2010 | Facemire et al. | |
| 2011/0047478 A1 | 2/2011 | Ellsworth | |
| 2011/0135102 A1 | 6/2011 | Huang et al. | |
| 2011/0149811 A1 | 6/2011 | Narayanaswamy | |
| 2012/0002002 A1 * | 1/2012 | Shaffer et al. | 348/14.09 |
| 2012/0128140 A1 | 5/2012 | Geppert et al. | |
| 2012/0140681 A1 * | 6/2012 | Kaminsky et al. | 370/261 |
| 2013/0017780 A1 | 1/2013 | Rose et al. | |
| 2013/0058473 A1 * | 3/2013 | de Jong | 379/202.01 |
| 2013/0252583 A1 | 9/2013 | Brown et al. | |
| 2013/0287198 A1 * | 10/2013 | Kotecha et al. | 379/207.02 |
| 2013/0294594 A1 | 11/2013 | Chervets et al. | |
| 2013/0297402 A1 | 11/2013 | Chen et al. | |
| 2013/0321133 A1 | 12/2013 | Michaelis et al. | |
| 2014/0064471 A1 * | 3/2014 | Krishnan et al. | 379/202.01 |
| 2014/0075493 A1 | 3/2014 | Krishnan et al. | |
| 2014/0211929 A1 | 7/2014 | Krishnan et al. | |

OTHER PUBLICATIONS

Mavridis, Ioannis, "Access Control based on Attribute Certificates for Medical Intranet Applications", Mar. 17, 2001, PMC/NCBI, V.3(1), page No. 1-16.

IEFT, SPLICES Working Group, Disaggregated Media in the Session Initiation Protocol (SIP), Jun. 25, 2011, http://toolsietf.org/html/draft-loreto-splices-disaggregated-media-02, 18 pages.

* cited by examiner

ENHANCING CONFERENCING USER EXPERIENCE VIA COMPONENTS

BACKGROUND

1. Technical Field

Disclosed embodiments generally relate to enhancing the user experience for conferencing communications, and, in particular, to methods of using components associated with user devices as ad hoc components of a conference.

2. Description of Related Art

During a conference call, the experience for participants in one location may differ from the experience of participants in other locations. For example, a participant in a conference room may be further away from communication equipment (e.g., a telephone or microphone) than a participant sitting at his desk. As a result, the voice and video of the participant in the conference room may be less audible or visible to those participants not in the room.

Various solutions attempt to mitigate the asymmetry between participant experiences by wiring rooms with additional equipment. For example, a conference room may be wired with hanging microphones, multiple cameras, control systems, etc. Other solutions may provide extensions to conferencing equipment such as microphone extensions. These solutions are inadequate in that additional equipment may be laborious and expensive to install and maintain. Additionally, control systems in a conference room may be non-trivial to operate.

Still other solutions may allow devices to be disaggregated so that an end user may select which devices are used as endpoints for various media during a conference. For example, a user may select a computer monitor as a video endpoint and a conferencing phone as an audio endpoint. A solution such as this may be insufficient, however, because it may not allow participants in close proximity to each other to use different equipment in an effective way.

BRIEF SUMMARY

Embodiments in accordance with the present invention may provide a method to utilize device components, including: receiving, in a memory, a first signal from a first telecommunications device indicating a request to connect to a communication session, wherein the first signal is associated with an identification of one or more multimedia components associated with the first telecommunications device; associating, using a processor, the one or more multimedia components with a location; receiving, in the memory, a second signal from the first telecommunications device, wherein the second signal comprises an indication to communicate using at least one of the one or more multimedia components associated with the telecommunications devices; receiving multimedia content from the first telecommunications device, wherein the multimedia content is generated using the at least one multimedia components indicated by the second signal; and selectively sending, using the processor, the multimedia content to at least one multimedia component capable of outputting the multimedia content.

Embodiments in accordance with the present invention may provide a method, including: receiving, in a memory, an identifier associated with a location; connecting, using a processor, with a telecommunications device based on the identifier; sending, using the processor, a signal to the telecommunications device, wherein the signal indicates an association with one or more multimedia components; receiving, in the memory, multimedia content from at least one of the multimedia components; and sending, using the processor, the multimedia content to the telecommunications device for transmission to a multimedia device.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings wherein like reference numerals in the various figures are utilized to designate like components, and wherein.

Figure 1:
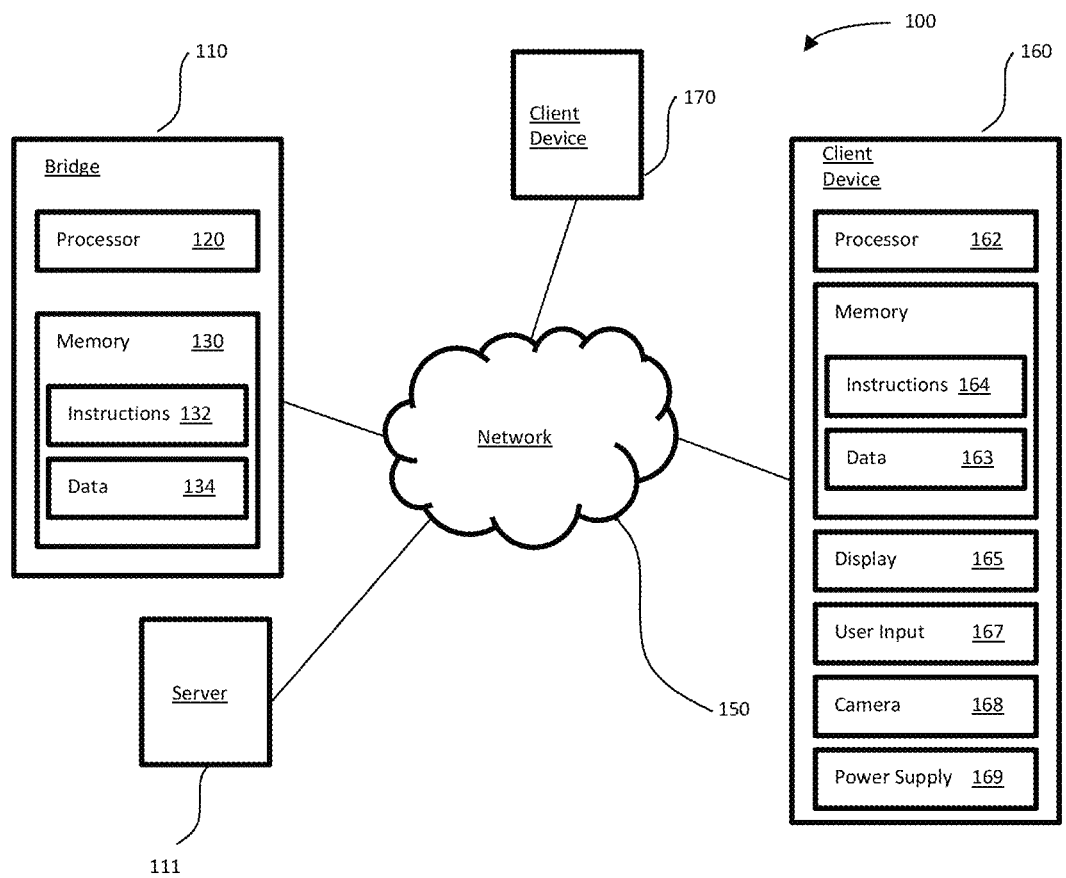
FIG. 1 is a functional diagram of a system according to one embodiment.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

As used herein, "user" and "participant" may be used interchangeably, unless a distinction is clearly intended, either explicitly or from the surrounding context.

Disclosed embodiments generally relate to enhancing the user experience during a telecommunications conference, and, in particular, to a system and method for using components of devices associated with users as ephemeral adjuncts to a conferencing system. Embodiments in accordance with the present invention may be used with other types of gatherings, such as a trade show, a symposium, a lecture, a retail store, a shopping mall, or other group of people.

In an advantage, disclosed embodiments may provide an ad hoc approach to associating multimedia components with a conference. The ad hoc approach allows for devices or components of devices to be independently used as input/output devices for communications as part of the conference, i.e., to be associated with the conference. For example, a participant who enters a conference room after the start of a conference may automatically have his device associated with the conference. The automatic aspect of associating the participant's device with the conference may be controlled (e.g., enabled or disabled) at least by the participant. In addition, a conference moderator or a moderator of the venue may be given override privileges to at least disable a device or all associated devices.

A participant may physically enter a coverage zone of a conference before the participant's device is associated with the conference. When the person leaves the zone of coverage, the person may no longer be associated with the conference and the logically associated device may be dropped from the conference. The participant would become like another non-BYOD-enabled conference attendee. Alternatively, if a person leaves the zone of coverage, the person's device association with the conference may be suspended (i.e., temporarily dropped from the conference), but sufficient credentials may be retained by the system so that the participant may re-associate with the conference more quickly if the participant re-enters the zone of coverage, or to use the sufficient credentials to dial into the conference as a regular participant if the person is outside the zone of coverage.

In yet another advantage, disclosed embodiments may provide an approach to associating components of a user device with equipment located in a conference room. Thus, a system in accordance with an embodiment of the present invention may conceptually treat a smartphone or its components, used by a participant, as originating from the main telecommunications equipment serving the conference room. A server may then control the input and output of multimedia components accordingly. As applied to a media stream originating from a participant's device, the server may be aware of the capabilities of the participant's device (e.g., frame size, frame rate, etc.) from information exchanged in order to join the device to the conference, and/or from the media stream itself. An application may be provided on the smartphone that reports the device capabilities, e.g., whether the smartphone has a camera, connected headphones, stereo sound, a soft or hard keyboard, identifying the codecs supported, screen size, etc. The resolution of video devices may also be determined by the application. For example, when a user temporarily disables a device (e.g., "mutes" a component or otherwise makes it unavailable), regular signaling mechanisms or other messages may make the resolution information available.

Another advantage of disclosed embodiments may include using the components associated with devices on an as-needed basis. A user associated with a device may, for example, have the device disabled when the user is not speaking. In addition, a conference moderator, venue moderator, or conference server may have the ability to disable a device or all associated devices upon discretion (e.g., to silence a heckler, or to silence a noisy device, etc.), or upon detection of a condition (e.g., malfunctioning equipment), or to prevent audience interruptions (e.g., during a keynote speech), and so forth.

Disclosed embodiments are illustrated below in conjunction with an exemplary communication system. Although well suited for use with, for example, a system using a server(s) and/or database(s), the disclosure is not limited to use with any particular type of communication system or configuration of system elements. Those skilled in the art will recognize that the disclosed techniques may be used in any communication application in which it is desirable to enhance a participant's experience during a conference using components associated with various devices.

The exemplary systems and methods of this disclosure will also be described in relation to application software, modules, and associated application hardware. However, to avoid unnecessarily obscuring the present disclosure, the following description omits well-known structures, components and devices that may be shown in block diagram form, are well known, or are otherwise summarized.

Figure 2:
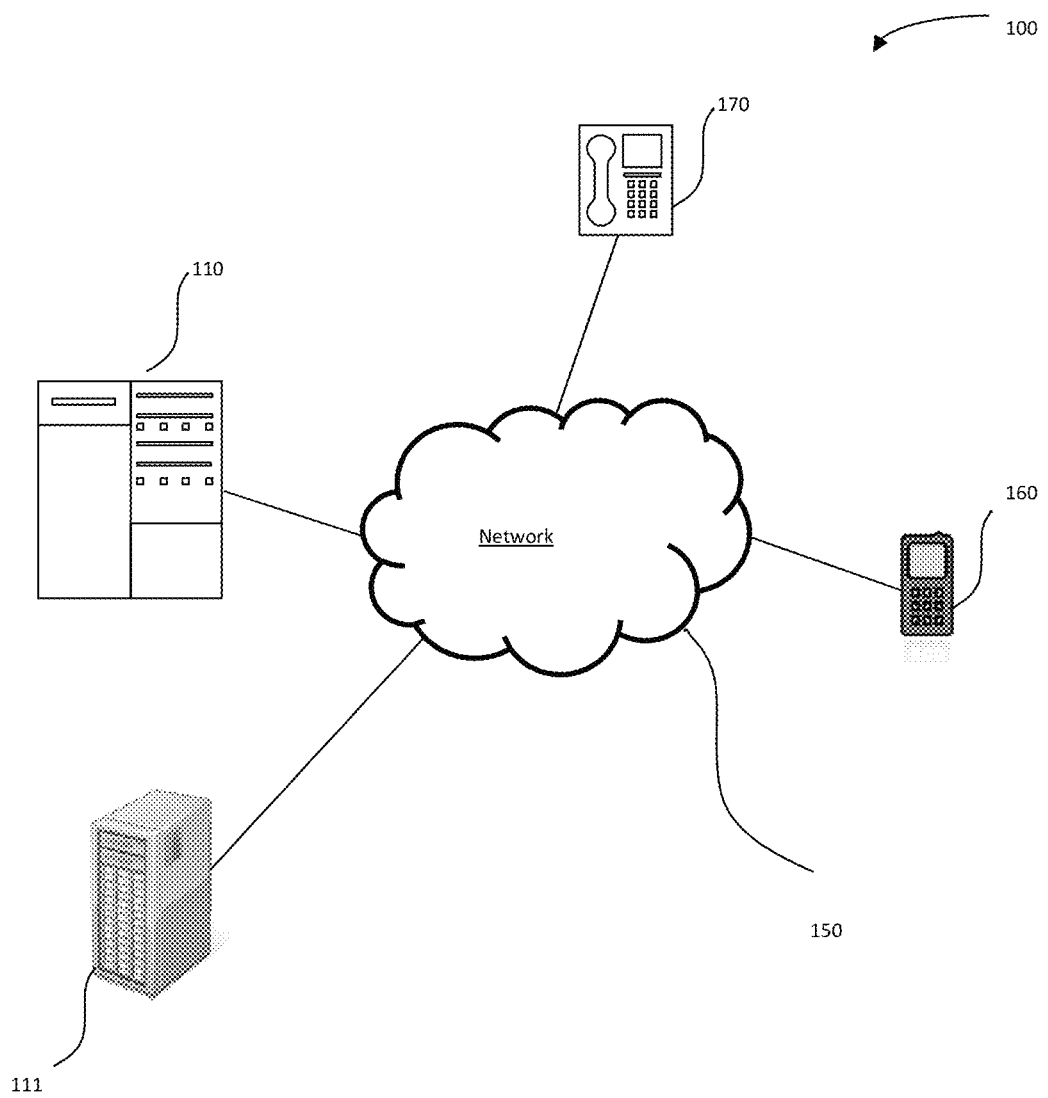
FIG. 2 is a pictorial diagram of the system of FIG. 1.

As shown in FIGS. 1-2, a system 100 in accordance with one aspect of the present technology includes server 110 containing a processor 120, memory 130 and other components typically present in a communication device.

The server 110 may comprise one or more telecommunications devices that can provide video and/or audio services, such as, for example, a video server, a Private Branch Exchange (PBX), a switch, or a network server or any other device capable of bridging/mixing audio and/or video streams. Furthermore, server 110 may be at one node of a network 150 and may be capable of directly and indirectly receiving data from and sending data to other nodes of the network. For example, server 110 may be capable of receiving data from client device 160 via network 150 such that server 110 uses network 150 to transmit and display information to a user on display 165 of client device 170. Server 110 may also be operable to receive data from client device 160 via network 150 and transmit the data to one or more output devices such as, for example, speakers or one or more displays that are associated with server 110. Similarly, server 110 may, for example, comprise a web server that is capable of receiving data from a server 111 such that server 110 uses network 150 to transmit information to server 111. Differences in capability between different media devices (e.g., a camera whose resolution does not match a resolution of a viewing device) may be handled by use of techniques such as clipping, interpolation, decimation, codec conversions, etc.

Server 110 may also comprise a plurality of devices that exchange information with different nodes of a network for the purpose of receiving, processing and transmitting data to client devices. In this instance, the client devices will typically still be at different nodes of the network than any of the devices comprising server 110. Although server 110 is shown external to network 150, server 110 may be part of network 150.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, solid-state drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as any commercially available CPU. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, a computer or a memory will be understood to include references to a collection of processors, computers or memories that may or may not operate in parallel.

Network 150 may be any telecommunications network such as, for example, the Internet, a Wide Area Network (WAN), a Local Area Network (LAN), the Public Switched Telephone Network (PSTN), Bluetooth, Near Field Communication (NFC), WiFi, a cellular network, and an Integrated Digital Services Network (ISDN). Furthermore, network 150 may include one or more telecommunications networks with various configurations and may use various protocols such as, for example, VoIP, TCP/IP, proprietary protocols, instant messaging, HTTP and SMTP, and various combinations of the foregoing. Although only a few computers are depicted in FIGS. 1-2, it should be appreciated that a typical system can include a large number of connected computers.

Each client device 160 or 170 may be any type of telecommunications device that can output a video and/or audio stream, such as, for example, a telephone, a cellular telephone, a Personal Computer (PC), a Personal Digital Assistant (PDA), a tablet computer, a monitor, a television, or a conference room video system. Furthermore, each client device may be configured similarly to server 110, as described above, and may include various components such as, for example, a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), output devices 166 (e.g., speaker, headset, headset connector), user input 167 (e.g., a mouse, keyboard, touch-screen or microphone), a camera 168, a battery power supply 169 or other power source, a network interface device, and all of the components used for connecting these elements to one another. Although shown as a single device, client devices 160 or 170 may be distributed between multiple devices. For example, client device 160 may be distributed between a telephone and a personal computer.

In addition to the operations described below and illustrated in the figures, various operations in accordance with aspects of the present technology will now be described. It should also be understood that the following operations do not have to be performed in the precise order described below. Rather, various steps can be handled in a different order or simultaneously. Steps may also be removed or added.

Figure 3:
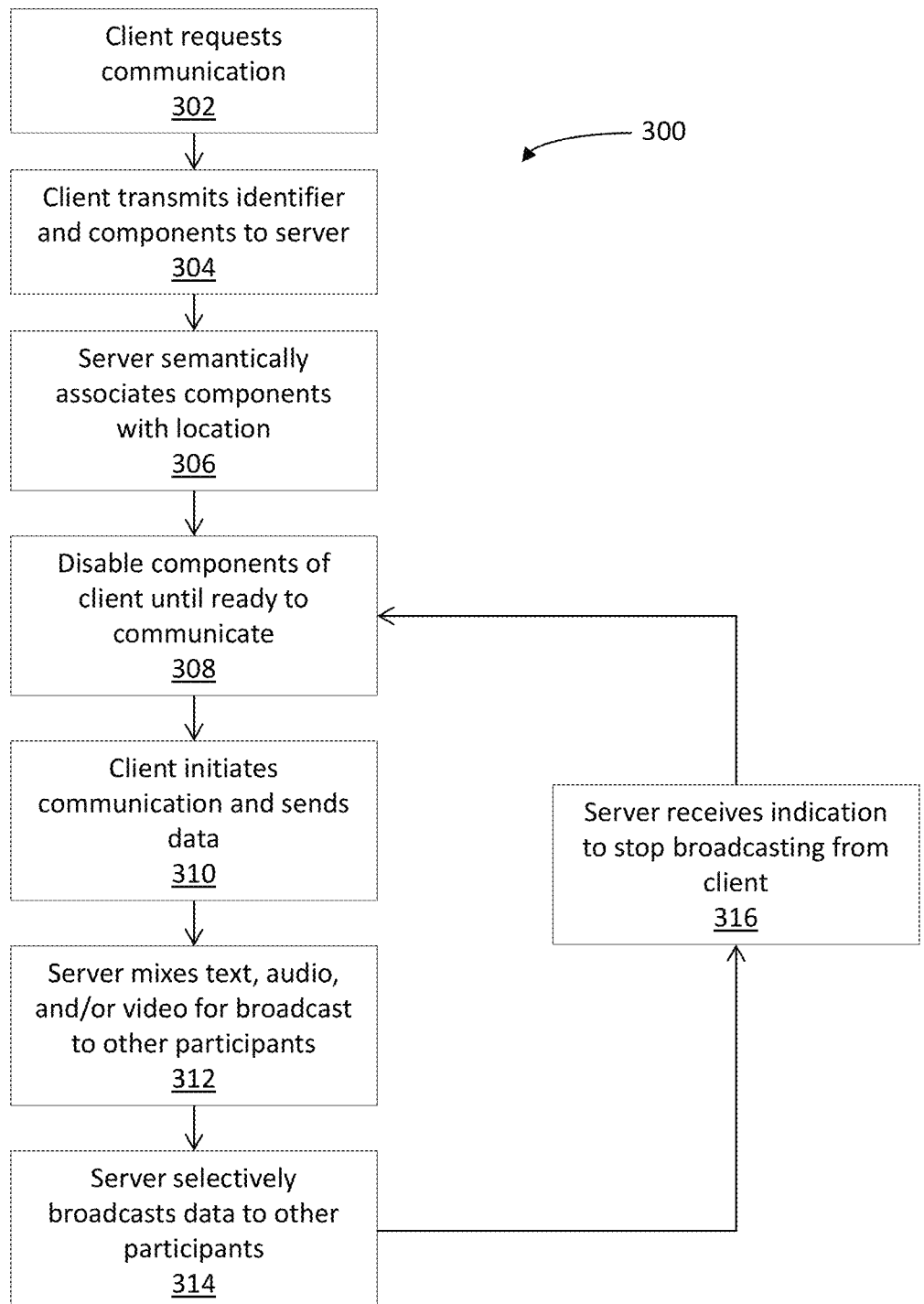
FIG. 3 is an exemplary flow diagram according to aspects of the disclosure.

FIG. 3 is an exemplary logic flow 300 for associating one or more devices with a conference. At block 302, a client device 160 situated in a particular location, such as, for example, a conference room, may request to initiate a communication with a server 110. Client device 160 may also broadcast its location so that other client devices within range are able to know the identity and location of client device 160. Users of the other client devices who receive the broadcast from client device 160 are able to request that the user of client device 160 initiate a communication with server 110. Similarly, other client devices may be broadcasting their own identity and location, which is received by client device 160, allowing the user of client device 160 to request that the user of the other client device initiate a communication with server 110. Alternatively, the broadcasts from client device 160 and other client devices may inform server 110, which may then cause server 110 to request that a client join the conference. Client device 160 may initiate the communication in various ways. For example, a user of client device 160 may enter a conference room identifier into their mobile device. The device may then authenticate with server 110 using the identifier.

In one embodiment, a code such as an alphanumeric code to be typed or a phrase to be spoken may be displayed in the conference room, such that the user of client device 160 enters the code into the device in order to authenticate the device and/or the user. Such a code would provide stronger authentication of the device rather than the user.

In accordance with an embodiment of the present invention, a code may be in the form of a challenge question and response answer. Such a code would provide stronger authentication of the user rather than the device.

In another embodiment, a projector or other visual display in the conference room may project a unique ID (e.g., a QR code) generated by server 110 that identifies the conference and/or the conference room. In yet another embodiment, a room moderator may use an input device associated with server 110 that directs the server to audibly transmit a code. A user may then input the code into client device 160 or may initiate an application that is capable of receiving the code, either as a visual display (e.g., the QR code) or as an audible code. In another embodiment, server 110 may periodically broadcast a code that is received by client device 160 via network 150. In another embodiment, connectivity between server 110 and client device 160 may be implemented as a WiFi network. A user who wants to participate via embodiments in accordance with the present invention is told of the WiFi SSID and password, and connecting to the network is considered to be implicit permission to use the smartphone or components as BYOD. The conferencing system may include an internet gateway so that the user may surf the Internet without disconnecting from the conference network.

In some embodiments in accordance with the present invention, the unique ID identifying the conference and/or conference room may be periodically changed, and participating users of client devices 160 may be asked to re-enter the new ID, e.g., by QR code or audio code. A benefit of changing the QR code is to ensure that the client devices 160 are still within the conference room.

A speakerphone is usually known to be in a certain room, but for some phones (e.g., a VoIP phone) its geo-location may not be available. In certain embodiments, the unique ID that identifies the conference or conference room may be used to find the physical geo-location of the conference room, by use of the geo-location information that smartphones ordinarily provide. For example, a display or audio output device in the conference room equipment may provide the unique ID code. The ID code is detected by one or more smartphones in the conference room. The one or more smartphones detecting the ID code provide the same ID code for association, which implies that the conference room (and so, the speakerphone in the conference room) is close to the smartphone's geo-location. Therefore, the geo-locations of the one or more smartphones that provided the ID code may be retrieved, a processing step may be applied (e.g., ignoring outliers that may represent users who physically left the conference, calculating a centroid of the locations of all smartphones that have joined the conference, rounding location resolution and performing a majority pick, etc.), and then assigning the processed geo-location information to the conference room.

At block 304, client device 160 may transmit to server 110 the identifier and/or information related to multimedia components associated with client device 160 using network 150. For example, client device 160 may notify server 110 that the client device includes a user input 167 (e.g., microphone), camera 168, and/or a keyboard. At block 306, server 110 may associate each of the multimedia components associated with client device 160 with a particular location. For example, client device 160, though an ad hoc device, may be associated with a conference room so that other participants of a conference call may not discern that a speaker is using an ephemeral, ad hoc device. That is, other participants of a call do not know that the speaker is using client device 160 rather than the main conferencing equipment associated with a location. Similarly, a camera 168, keyboard, or other input device 167 associated with client device 160 may be associated with a conference room so that participants in other locations may not discern that a user of client device 160 is not using the main conferencing equipment in his location.

At block 308, various components of client device 160 may be temporarily disabled while device 160 is associated with server 110. These components may be disabled automatically, by a moderator, at the direction of server 110, and/or by a user of client device 160 via software or hardware. For example, when client device is not being used for the conference, disabling may entail that server 110 may not broadcast any data received from device 160. Alternatively, client device 160 may not send any input received from a user while in a disabled mode.

Embodiments in accordance with the present invention may be implemented as a separate app on client device 160, so that by switching apps the user is able to use client device 160 for other tasks during portions of the conference that the user may not be too interested in. Alternatively, the system may determine that a person is not required for a portion of the conference (e.g., by reliance upon an agenda and the progress toward it) and disable client device 160 (e.g., for inputs/comments/etc.). Alternatively, out of band messages may be sent to the device so that the user can communicate on other aspects or to temporarily leave the conference room.

At block 310, client device 160 or a participant using client device 160 (hereinafter "active participant") may initiate communication with server 110 and begin sending multimedia content (e.g., text, audio, and/or video). In one embodiment, a user may activate a control (e.g., press a button, click on a link, etc.) on client device 160 to initiate communication. In another embodiment, an active participant may initiate communication with server 110 by starting and/or interacting with an application associated with client device 160. In yet another embodiment, an active participant may begin using an input device associated with client device 160 (e.g., a microphone, keyboard, camera 168) to initiate communication with server 110.

In another embodiments in accordance with the present invention, activation and transmission of audio and/or video from an active participant may be implemented via a push to transmit ("PTT") interface, such that the active participant must keep the interface pushed (i.e., activated) in order to keep client device 160 actively transmitting. The PTT interface may help prevent a situation in which the active participant forgets to disable client device 160 after it has been used to send multimedia content to the conference. Alternatively, server 110 may analyze for user attention or inattention, or a local app (e.g., by using camera 168 in client device 160) may analyze for user attention or inattention (e.g., by facial analysis), and disable client device 160 if there is insufficient activity involving it.

At block 312, server 110 may mix audio, video, and/or text content received from client device 160, thereby forming mixed content. For example, server 110 may mix audio from a microphone associated with client device 160 with video from a camera 168 associated with client device 160. As a result, server 110 may conceptually treat content from client device 160 as though it is coming from conferencing equipment in the same conference room as client device 160. Because client device 160 is associated with the conference room, participants both in the conference room and in other locations may not distinguish that an active participant is using client device 160.

In some embodiments, instructions may be sent to one or more users of client devices 160 in a conference room, by the moderator or other users, to provide a zoomed image or specific images in the room, providing an ability to share remote controlled cameras or documents. The shared cameras or documents may be recorded along with the main video/audio stream for later viewing.

In some embodiments, multiple images of the conference room from various client devices 160 may be used to provide a panoramic view of the conference room. The panoramic view may be useful to observe the conference room in several directions. The panoramic view may also be useful to identify other conference participants who may have alternative viewing angles or audio/visual perspectives of interest.

In some embodiments the video from various client devices 160 is usually not mixed with the video from the conference room video camera.

The graphic media from client device 160 (e.g., of a user speaking) can be in the form of a still image or a video.

The video or image from client devices 160 may be given greater preference for display on a conference-wide display than video from the conference room video camera if the image from client device 160 is clearer, more detailed, etc. Alternatively, embodiments may show the image from client device 160 in addition to the conference room video, such as by way of a split-screen display.

At block 314, server 110 may selectively broadcast the mixed content received from client device 160 to other conference participants. Additionally, server 110 may broadcast an indication that client device 160 is associated with a location or conferencing equipment at a location. In one embodiment, server 110 may transmit the mixed content to one or more telecommunications devices using network 150, similar to a direct call between devices over the PSTN. Alternatively or additionally, server 110 may transmit the mixed content to devices associated with the same location as client device 160. For example, a user of client device 160 may be able to send a text message addressed to substantially all conference participants in that location (e.g., everyone else in the conference room). The communication may be through server 110 or via peer-to-peer messages for devices in the conference room. Alternatively, the user of client device 160 may see a list of devices and/or conference participants in that location and send the text message to a subset of devices or participants at the location. In another example, server 110 may transmit the mixed content to one or more multimedia devices including, for example, telecommunications devices also associated with server 110, speakers and a display located in the same conference room as client device 160, and/or a combination of these or other devices. Such transmissions may be useful to reach additional participants in a virtual conference or an overflow conference room.

At block 316, server 110 may continue to mix and broadcast content from client device 160 until an indication is received to end the broadcast. The indication may be received from a moderator, at the direction of a device 170 associated with the conference, and/or from client device 160, or by automated analysis. When an indication is received, process 300 may go to block 308 to disable communication of client device 160 with other participants.

One advantage of the disclosure is to allow audio and video from a participant in a conference to be perceived with more clarity by way of the participant using components of an ad hoc device in close proximity. Additionally, rather than, for example, supplementing equipment in a conference room with costly additional equipment such as microphones and cameras, a telecommunications device already owned by a participant may be used to transmit audio and video from any location within a room.

In another embodiment in accordance with the present invention, components of client device 160 may be shared with other users and/or client devices in the vicinity. For example, during a Q&A session, users of the embodiment may activate components of client device 160, e.g., turn on their microphone and camera 168. A user may start speaking who is not using their own client device 160 or does not have one. Whether an utterance is speaking publicly (e.g., intended for the Q&A session) or speaking privately (e.g., intended as a private conversation with someone nearby) may be determined by heuristics. For example, if the volume of the utterance is below a predetermined threshold as measured by a main conference microphone, then the utterance may be classified as a private conversation. A signal-to-noise ratio may be used instead of volume, under the assumption that a user addressing the conference will speak louder and other persons will tend to be quieter. Or, a real-time video of the user may be studied to determine whether the user is facing a conference microphone, stage, or the like, or whether the user is facing away from the conference microphone, stage, etc. If the user is facing away from the conference microphone, etc., then the utterance may be classified as a private conversation. Or, a spoken keyword or the like may be used to indicate that the utterance is intended for the conference, or intended to be a private conversation.

Assume that the utterance is not intended to be part of a private conversation. Based on analysis of the sound intensity or other quality indicator of the sound received by other client devices 160 that are acoustically near the user, the closest client device 160 or the client device 160 with the best acoustic reception of the speaker may provide an indication and that it can be "borrowed" by the speaker. The analysis may include a cross-correlation among sounds received by the nearby client devices 160, so that a decision is based upon the sounds of the user rather than, e.g., loud background noises. The analysis may be repeated periodically in case the relative quality indicators have changed (e.g., a user has moved). The main conferencing device can also indicate the necessity of using a component based upon an intensity of received audio (i.e., audio level) and/or video (i.e., ability to detect the current speaker). Alternatively, more than one nearby client device 160 may be used in order to provide a stereo effect or surround-sound effect for audio output or input.

In another embodiment in accordance with the present invention, the location of client device 160 in a conference room may be determined, e.g., by using wireless signal strength metrics. Triangulation may be used to find the closest known client device capable of supporting embodiments in accordance with the present invention, and suggest or request that the found client device be shared with the user of client device 160.

In another embodiment in accordance with the present invention, device components are ephemeral in the sense that device components may enter and leave the conference as their users enter and leave a conference with their respective client device 160. The ephemeral aspect at times makes the devices unavailable to others in the conference.

Users may take the conference with them using other known techniques. For example, rather than a having a user break an association of client device 160 to the conference room if the user leaves the conference room, the user may choose to take the conference with them either with or without entering additional security credentials.

In another embodiment in accordance with the present invention, BYOD with separately sharable components offers advantages compared to BYOD without separately sharable components. For example, bandwidth conservation is possible if media streams do not need to be sent to the devices if the media stream is not explicitly requested. In effect, the unshared components of a BYOD device remain in a suspended but available state until the components are explicitly used.

In another embodiment in accordance with the present invention, a server may analyze a quality of audio and/or video media streams being received from multiple sources, e.g., from the components of various client devices 160 or the conference room equipment, and choose the media stream having superior quality. The media volume and/or quality at a client device 160 may be analyzed and used to change the quality of the conference room equipment media. For example, if a client device 160 at a remote part of the room indicates low received audio volume, the conference room speaker volume can be increased. In this way, one or more client devices 160 may monitor the conference room environment.

In another embodiment in accordance with the present invention, individual users may zoom in on specific aspects of a video feed on their devices, if needed.

In another embodiment in accordance with the present invention, audio and video samples provided by the user of client device 160 may be associated with an identifier of client device 160, and the identifier may then be used in later interactions.

As these and other variations and combinations of the features discussed above can be utilized without departing from the disclosure as defined by the claims, the foregoing description of exemplary embodiments should be taken by way of illustration rather than by way of limitation of the invention as defined by the claims. Certain exemplary embodiments may be identified by use of an open-ended list that includes wording to indicate that the list items are representative of the embodiments and that the list is not intended to represent a closed list exclusive of further embodiments. Such wording may include "e.g.," "etc.," "such as," "for example," "and so forth," "and the like," etc., and other wording as will be apparent from the surrounding context. Rather, the examples are intended to illustrate only some of many possible aspects.

Embodiments of the present invention include a system having one or more processing units coupled to one or more memories. The one or more memories may be configured to store software that, when executed by the one or more processing unit, allows one or more callers to be authenticated by responding to a challenge request, at least by use of processes described herein, including at least in FIG. 3, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

The invention claimed is:

1. A method, comprising:
   receiving, in a memory of a server, a first signal from a first telecommunications device indicating a request to connect to a communication session, wherein the first signal is associated with an identification of one or more multimedia components of the first telecommunications device;
   associating, using a processor of the server and coupled to the memory, the one or more multimedia components with a location, to produce an association;
   disabling one or more multimedia components of the first telecommunication device while the first telecommunication device is in association;
   receiving, in the memory, a second signal from the first telecommunications device, wherein the second signal comprises an indication to communicate using at least one of the one or more multimedia components of the first telecommunications device;
   receiving multimedia content from the first telecommunications device, wherein the multimedia content is generated using the at least one multimedia components indicated by the second signal;
   mixing, by the server, the multimedia content from the first telecommunications device with a second multimedia content, to produce a mixed multimedia content; and
   selectively sending, using the processor, the mixed multimedia content to at least one multimedia component capable of outputting the mixed multimedia content.

2. The method of claim 1, wherein the first telecommunications device is configured to be disabled by remote control.

3. The method of claim 1, wherein the request to connect relates to communication within a zone of coverage.

4. The method of claim 3, further comprising:
   detecting that the first telecommunications device has left the zone of coverage; and
   suspending the association.

5. The method of claim 1, further comprising:
   detecting that the first telecommunications device has stopped communicating for a predetermined period of time; and
   suspending the association.

6. The method of claim 1, further comprising: providing an identification code of the communication session to the first telecommunications device.

7. The method of claim 1, further comprising:
   determining that a user of the first telecommunications device is not a required participant of the communication session; and
   suspending the association.

8. The method of claim 1, wherein the selective sending further comprises sending the location as the source of the multimedia content.

9. The method of claim 1 wherein the multimedia components of the first telecommunications device comprise one or more of a microphone, camera, and keyboard.

10. The method of claim 1 wherein the multimedia content comprises one or more of text, audio, and video.

11. The method of claim 1 wherein the location is determined by wireless signal strength metrics.

12. The method of claim 3, further comprising:
    detecting that the first telecommunications device has left the zone of coverage; and
    extending the association to the first telecommunications device outside the zone of coverage.

13. The method of claim 1, wherein the step of selectively sending multimedia content comprises the steps of:
    receiving a request to share a multimedia component; and
    sending a multimedia content to the multimedia component.

14. The method of claim 1 wherein the at least one multimedia component comprises one or more of speakers and a display.

15. The method of claim 1 further comprising receiving an indication to stop selectively sending the multimedia content to the at least one multimedia component.

16. The method of claim 13 further comprising receiving multimedia content from a second telecommunications device.

17. A method to share a multimedia device comprising one or more components, the method comprising:
    receiving, by a conference server, an identifier of active components within a location;

determining, by a conference server, a location of a user who is speaking;

analyzing an audio received by a plurality of active components within a plurality of multimedia devices within a predetermined distance from the user, to produce a reception quality for the respective active components within the predetermined distance from the user;

selecting a first active component and associated first multimedia device from among the plurality of multimedia devices based upon the reception quality; and sharing audio multimedia content from the selected first active component to a multimedia device different than the selected first multimedia device.

18. The method of claim 17, further comprising notifying the selected first multimedia device that its multimedia content is being provided to a different multimedia device.

19. The method of claim 17, further comprising determining whether the user is speaking publicly or privately.

20. The method of claim 17, further comprising:

selecting a second active component and associated second multimedia device based upon the reception quality; and sharing a second audio multimedia content from the second selected active component to the multimedia device different than the selected first or second multimedia device.

* * * * *